Figure 1:
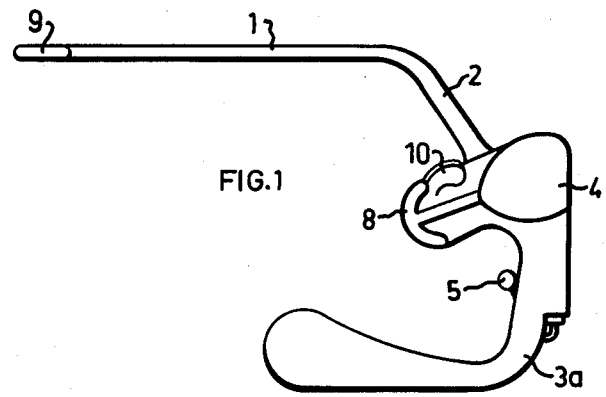

Dec. 22, 1964    H. E. BIRCH-IENSEN    3,162,175
HOLDER FOR EGG PRODUCTION RECORDING APPARATUSES
Filed Aug. 30, 1963

3,162,175
HOLDER FOR EGG PRODUCTION RECORDING APPARATUSES
Hans Eugen Birch-Jensen, Hallstorps Gards, Billeberga, Sweden
Filed Aug. 30, 1963, Ser. No. 305,748
Claims priority, application Sweden, Sept. 6, 1962, 9,640/62
3 Claims. (Cl. 119—1)

This invention relates to a holder for an egg production recording apparatus for example of the type which is the subject matter of U.S. Patent No. 3,123,044 issued on March 3, 1964.

The above mentioned holder is arranged to be fastened to a hen by means of a harness and to carry a counter with a movable input element for said counter located beneath the hen's tail.

Naturally, the holder shall be so designed as to fix the input element of the counter as steadily as possible in its normal position in relation to the hen's body so that it will definitely register each egg laid by the hen and cannot possibly double-register an egg owing to the egg being partially discharged and repeatedly withdrawn before it is completely discharged, which is a fully normal occurrence in egg laying.

Thus the precise fixation of the counter and particularly of the input element thereof in relation to the hen's body is of decisive importance to the reliability of an egg production recording apparatus of the type contemplated and the present invention aims at further improving the holder in this respect by making it bear better against the hen's body.

Figure 3:
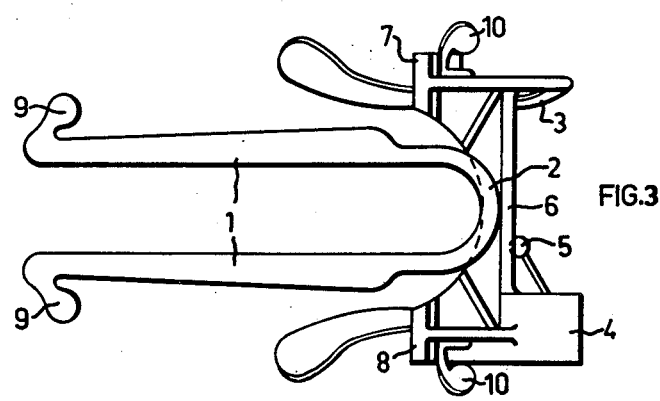
Figure 2:
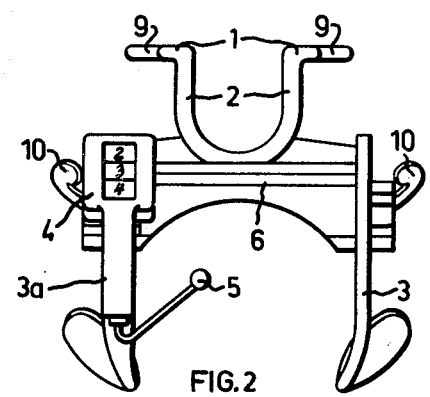

The invention is illustrated in the accompanying drawing which by way of example shows an embodiment of the holder. In the drawing:

FIG. 1 shows the holder as seen from the left;
FIG. 2 shows the holder as seen from the rear;
FIG. 3 shows the holder as seen from above.

Terms such as "from the left," "from the rear" etc. refer throughout to the hen carrying the egg production recording apparatus.

In the drawing, 1 denotes a two part back portion, 2 a pair of limbs fixedly connected to the back portion and embracing the hen's tail root, and 3, 3a a pair of downwardly directed arms which are bent in a forward direction at their lower ends and one of which 3a carries a counter 4 and a movable input element 5 for said counter.

As will appear from the drawing, the rear ends of the limbs 2 are fixedly connected to the central portion of a cross member 6 which projects laterally and from the ends of which the arms 3, 3a extend. The front of said cross member 6 which faces the rear part of the hen, is arcuate and has forwardly projecting end portions 7 and 8. These forwardly projecting portions are spaced apart a distance based on the distance between the hen's ischium so that with the holder mounted in position on the hen said portions 7 and 8 will be supported on the ischium which constitutes part of the rigidly consolidated pelvic girdle of the hen's skeleton. By this support the input element of the counter will be steadily and exactly located in a longitudinal direction with regard to the hen's body while the limbs 2 and arms 3, 3a keep said element correctly positioned in a vertical and lateral sense.

The holder is provided with buttons or hooks 9 and 10 to permit it being fastened to the hen by means of a harness provided with holes to permit said harness to be buttoned or hooked onto the holder and hold it in position on the hen, which is described more in detail in the U.S. Patent No. 3,123,044 referred to in the introduction.

What I claim and desire to secure by Letters Patent is:
1. A holder to be fastened to a hen by means of a harness and including a counter with a movable input element actuated by an egg during discharge by the hen, comprising:
 (a) a pair of spaced back portions adapted to lie along opposite sides of a hen's spine,
 (b) said back portions terminating at their rear end portions in a pair of downwardly and rearwardly extending limbs,
 (c) said limbs curving inwardly and meeting at their rear end portions to underlie the hen's tail root,
 (d) a cross member secured to said limbs at the rear portion thereof and extending downwardly and forwardly on either side and below said limbs,
 (e) said cross member terminating at its forward end in rounded spaced end portions so located as to engage the hen on opposite sides at the ischium,
 (f) said cross member being recessed between said spaced rounded end portions so that only said spaced rounded end portions engage the hen,
 (g) and a pair of spaced arms secured to said cross member, extending downwardly and forwardly therefrom and terminating downwardly and forwardly of said rounded spaced end portions of said cross member, to bear upon the bottom of the hen's body on each side thereof.

2. The holder of claim 1, wherein said counter and movable input element are carried by one of said spaced arms.

3. The holder of claim 1, and hooks on adjacent the forward ends of said spaced back portions and on opposite sides of said cross member for attachment of a harness to secure the holder to the hen's body.

References Cited in the file of this patent
UNITED STATES PATENTS

| | | |
|---|---|---|
| 1,439,132 | Shallit | Dec. 19, 1922 |
| 1,575,190 | Coackley et al. | Mar. 2, 1926 |
| 1,861,854 | Greene | June 7, 1932 |